US006759564B2

(12) United States Patent
Max et al.

(10) Patent No.: US 6,759,564 B2
(45) Date of Patent: Jul. 6, 2004

(54) HYDRATE-BASED DECONTAMINATION OF TOXIC GASES

(75) Inventors: Michael D. Max, Washington, DC (US); Sarah A. Holman, Bethesda, MD (US)

(73) Assignee: Marine Desalination Systems, L.L.C., Washington, DC (US)

( * ) Notice: Subject to any disclaimer, the term of this patent is extended or adjusted under 35 U.S.C. 154(b) by 86 days.

(21) Appl. No.: 10/270,054

(22) Filed: Oct. 15, 2002

(65) Prior Publication Data

US 2004/0024280 A1 Feb. 5, 2004

Related U.S. Application Data

(60) Provisional application No. 60/354,248, filed on Feb. 6, 2002, and provisional application No. 60/329,316, filed on Oct. 16, 2001.

(51) Int. Cl.$^7$ ................................................. A62D 3/00
(52) U.S. Cl. .................... 588/200; 588/238; 588/249
(58) Field of Search ............................ 588/200, 238, 588/249; 205/546; 423/245.2, 462, 472, 500

(56) References Cited

U.S. PATENT DOCUMENTS 4,115,529 A * 9/1978 Behling ...................... 423/472
4,842,831 A * 6/1989 Yabumoto et al. .......... 422/198

OTHER PUBLICATIONS

U.S. Material Safety Data Sheets from http://www.boc.com/gases/msds/us/index/msds/us.cfm.
Bozzo et al., The Properties of the Hydrates of Chlorine and Carbon Dioxide, *Desalination*, 16 (1975) pp. 303–320.
Jeffrey et al., "The Clathrate Hydrates", 1967, Prog. Inorg. Chem, 8, pp. 52–53.
Lide, (ed.) Bond Lengths and Angles in Gas–Phase Molecules, CRC Handbook of Chemistry and Physics, 2001–2002 82$^{nd}$ edition, Chapter 9, p. 17.
Max, (ed.), Dillon and Max, The U.S. Atlantic Continental Margin; the Best–KnownGas Hydrate Locality, *Natural Gas Hydrate in Oceanic and Permafrost Environments*, Chapter 13, pp. 157–170.

Max et al, Oceanic Methane Hydrate: The Character of the Blake Ridge Hydrate Stability Zone, and the Potential for Methane Extraction, *Journal of Petroleum Geology*, vol. 21(3), Jul. 1998, pp. 343–357.

Disinfection with Chlorine, Wastewater Engineering, Sci. TD645.M57, Metcalf & Eddy, Inc.; p. 360.

Sloan, Molecular Structures and Similarities, Clathrate Hydrates of Natural Gases, second edition, Chapter 2, pp. 45, 46 and 54.

SPECTRUM, Chemical Fact Sheet, Bromine from http://www.speclab.com/elements/bromine.htm (3 pages).

Deputy for Technical Services Publications, U.S. Army Center for Health Promotion & Preventive Medicine, last updated Jul. 23, 1998, Detailed Chemical facts Sheets, Wednesday, Oct. 3, 2001 (28 pages).

Chemistry: WebElements Periodic Table: Periodic properties: Van der Waals radius: Definition from http://www.webelements.com/webelements/properties/text/definitions/van–der–waals–radius.html (2 pages), http://www.webelements.com/webelements/properties/text/image–group–1/van–der–waals/radius.html (2 pages), http://www.webelements.com/webelements/properties/text/image–group–15/van–der–waals–radius.html (2 pages).

* cited by examiner

*Primary Examiner*—Stuart L. Hendrickson
*Assistant Examiner*—Peter J Lish
(74) *Attorney, Agent, or Firm*—Pillsbury Winthrop LLP (57) ABSTRACT

Areas in which toxic material has been released, particularly in gaseous form but also in liquid form, are decontaminated by forming gas hydrate of the toxic agent. Smaller-molecule toxic agents form sI or sII type hydrates, whereas larger-molecule toxic agents for sH type hydrates. A "companion gas" or "companion agent" is supplied to fill the smaller voids of the sH hydrate, thereby enabling larger-molecule toxic agents to form hydrates by filling the larger voids of the sH hydrate which, but for the presence of the smaller-molecule agent in the smaller voids, would be unstable and not form. Portable as well as fixed, permanently installed apparatus for conducting hydrate-based decontamination is also disclosed.

53 Claims, 4 Drawing Sheets

HYDRATE-BASED DECONTAMINATION OF TOXIC GASES

This Application is based on and claims the benefit of Provisional Patent Application Nos. 60/329,316 filed Oct. 16, 2001, and 60/354,248 filed Feb. 6, 2002, the entire contents of which are hereby incorporated by reference.

1. FIELD OF THE INVENTION

The invention relates to decontamination using gas hydrate to capture toxic gas molecules and render them inert within solid gas hydrate crystals.

2. BACKGROUND OF THE INVENTION

The United States now faces increased terrorist threats. Of concern is attack using toxic gases and/or liquids.

Beside terrorist attacks, other dangers involving toxic gases exist. For example, certain gases and liquids that are available for industrial use may be highly toxic. These and other gases that are commercially and widely available are likely to be spilled in quantities on the scale of large tanker trucks, either accidentally or deliberately, well away from the industrial sites at which they are normally handled (and where such spills ordinarily are attended to).

Decontamination of major spills of toxic gases is generally difficult due to the chemical hazard presented (both to innocent bystanders as well as to decontamination personnel) and because the toxic materials often are highly persistent and difficult to capture. Typically, it is believed, "clean-up" involves little more than dilution of the toxic material, which is often simply washed or flushed away rather than collected and disposed of safely because collecting toxic material and concentrating it is difficult and dangerous.

In general, gas hydrate is a non-stochiometric mineral species that forms from water and gas molecules. The crystalline structure is an open network of water molecules, with voids containing the gas molecules. The presence of the gas molecules stabilizes the water molecule meshwork via van der Waals electrostatic bonding. The voids in gas hydrate usually are of different sizes, depending on the particular type of gas hydrate species. Table 1 below shows examples of the void sizes of the three most common types of naturally occurring hydrate, from which the size of the gas molecule that can form a particular type of hydrate can be estimated. (Other types of hydrate species may have different (i.e., smaller or larger) ranges of void size and/or different numbers of voids.) To determine the diameter of a gas molecule that may be accommodated in a particular void, it may be necessary to subtract the van der Waals radius of the water molecule (1.4 Å) from the average cavity radius.

TABLE 1

| Hydrate Crystal Structure | I (sI) | | II (sII) | | H (sH) | | |
|---|---|---|---|---|---|---|---|
| Void Size | Small | Large | Small | Large | Small | Medium | Large |
| Description | $5^{12}$ | $5^{12}6^2$ | $5^{12}$ | $5^{12}6^4$ | $5^{12}$ | $4^35^66^3$ | $5^{12}6^8$ |
| Number of Cavities/Unit Cell | 2 | 6 | 16 | 8 | 3 | 2 | 1 |
| Average Cavity Diameter, Å | 7.90 | 8.66 | 7.82 | 9.46 | 7.82 | 8.12 | 11.42 |

In addition to the geometric information shown in Table 1, pressure/temperature fields of stability for a wide variety of gas hydrates are known, with the fields of stability for hydrate of some gases being more completely known than the fields of stability for hydrate of other gases. In general, the most information is known about sI gas hydrates, which include the relatively common methane hydrate (very widely distributed naturally on Earth) and carbon dioxide hydrate. Often (but not always) sII type hydrate will include more than one type of gas.

Pressure/temperature fields of stability for various sH type gas hydrates are also known, albeit comparatively imperfectly. (The term "sH" is used at the present time to describe gas hydrates in which the dimensions of the voids that house the gas molecules are strongly different; it is likely that many species of hydrate that have yet to be described will fall within this sH category.) For a given gas or mixture of gases, however, it is known that sH gas hydrates will form under certain pressure and temperature conditions, and the ability of a given gas or mixture of gases to form hydrate is widely and strongly believed to be a function of the size of the gas molecule. Table 2 below shows examples of relatively large-molecule gases that are known to occupy the large void spaces of sH type gas hydrate.

TABLE 2

| Large Guest | Diameter, Å | Pressure, MPa | Temperature, °C. |
|---|---|---|---|
| 2-Methylbutane | 7.98 | 1.974 | 0 |
| 2,3-Dimethylbutane | 7.99 | 1.439 | 0 |
| 2,2-Dimethylbutane | 7.97 | 1.064 | 0 |
| 2,2-Dimethylpentane | 9.25 | 2.140 | 0 |
| 3,3-Dimethylpentane | 9.24 | 1.373 | 0 |
| 2,2,3-Trimethylbutane | 8.00 | 0.959 | 0 |

(The pressure and temperature values are single-point data (rather than field data) at which hydrate of the guest gas molecule is stable.)

3. SUMMARY OF THE INVENTION

The present invention overcomes many limitations of the present practices for decontamination of various toxic gases by forming gas hydrate using the toxic gas as the hydrate-former and carrying out this process of gas hydrate formation under controlled conditions that allow the toxic gas to be captured safely and disposed of. Trapping toxic gas molecules in the form of crystalline gas hydrate renders the gases chemically non-reactive and essentially safe to handle.

Relatively small-diameter toxic gas molecules can form type sI or type sII hydrate. In order to capture larger-molecule toxic gases in hydrate, which larger-molecule gases are too large to fill the voids within type sI or type sII hydrate, type sH hydrate is caused to be formed. Because the larger-molecule toxic gases are also too large to fill the smaller voids in the sH type hydrates, but are able to fill the larger voids in the type sH hydrate, a "companion gas" or "companion agent" is provided. The companion gas or agent fills the smaller voids in the type sH hydrate, and the larger-molecule toxic agent fills the larger voids in the type sH hydrates. Presence of the companion agent renders the hydrate crystals stable, thereby facilitating hydrate-based decontamination of larger-molecule toxic agents.

Once captured in gas hydrate, the toxic gas molecules are chemically unreactive and generally safe to handle. The toxic gas remains safe so long as the hydrate is maintained under conditions of stability for the particular gas hydrate.

Specialized apparatus according to the invention is provided, which apparatus ingests air that has been polluted by toxic gas into a hydrate formation vessel that is pressurized and cooled (as required) so that when water is introduced into the hydrate formation vessel, hydrate of the toxic gas will form spontaneously. Alternatively, the hydrate formation vessel may be filled with water and the toxic gas introduced into the water-filled vessel to form hydrate. The toxic gas hydrate is then concentrated and collected by allowing it to settle within the hydrate formation vessel.

A pressurized hydrate formation vessel or vessels utilize(s) a water spray in a pressurized environment in which the pressure/temperature regime is suitable for the formation of gas hydrate using the toxic gas itself as the hydrate-forming agent. Water, which is obtained either from local sources or brought to the location, is brought into contact with the toxic hydrate-forming gas-and-air mixture that has been ingested into the apparatus so that solid gas hydrate will form and be concentrated. Thus, the hydrate-forming gas can be concentrated and removed from the decontamination site in a safe and expedient manner.

After the hydrate has been accumulated, thereby concentrating the toxic gas, the water and the toxic gas can be separated by altering the pressure and/or temperature conditions under which the hydrate is held to render the hydrate unstable, thus causing the toxic gas hydrate to dissociate under controlled conditions. The toxic gas is released from the hydrate and recovered in a relatively pure and highly concentrated form—either pressurized or as a liquid, depending on the pressure/temperature characteristics of the particular toxic hydrate-forming gases and on the desired nature of the product—thus minimizing the volume of toxic material to be handled. Water is recovered and reused for further formation of toxic gas hydrate, thus minimizing the amount of water to be treated for dissolved toxic gas and other pollutants following successful completion of the decontamination operation.

Toxic gas hydrate decontamination units according to the invention can be fixed or portable. In order for decontamination apparatus to be used effectively, however, it must be employed at the point of use as rapidly as possible. Therefore, in a preferred embodiment, toxic gas hydrate decontamination units are highly portable. Thus, modular and highly portable apparatus is built into standard containers for free-standing or truck-mounted use with a minimum amount of site preparation required. The need for rapid set-up and deployment is a result of the nature of chemical hazards, which tend to spread out over time and extend their toxicity over larger areas as a function of their expansion and dilution. Thus, the sooner decontamination apparatus can be brought into use, the more effective it will be, since the toxic gas will be more concentrated and a smaller amount of mixed air will have to be ingested and processed to capture the toxic gas. This will result in faster decontamination and diminish the likelihood of damage.

In a preferred embodiment of portable hydrate-based decontamination apparatus, the toxic gas hydrate vessel constitutes not only the pressurized container in which the toxic gas hydrate is formed, but also the collection and dissociation vessel. This has the benefit of minimizing the number of containers in which the toxic gas and hydrate must be contained and of minimizing the chance of spillage when the toxic gas hydrate is transferred from one vessel to another.

Theoretically, it should be possible to capture virtually every molecule of the toxic gas that is present, assuming sufficient water can be brought into the immediate vicinity of the gas molecules. That is because the gas molecules occupy lattice sites within the hydrate crystals, which have a water molecule framework; in the presence of excess water, thermodynamic principles drive every gas molecule to form hydrate within the field of stability for the particular gas hydrate. For certain toxic gases, single gas molecules can form basic cells of gas hydrate. Thus, even very small quantities of toxic gas molecules can form toxic gas hydrate. In principle, in the presence of excess water, every toxic gas molecule can be captured in the form of solid hydrate and separated from the air with which it was brought into the hydrate formation vessel. This would result in treated air (and water) that is virtually entirely decontaminated following extraction of the toxic gas molecule from the air.

4. BRIEF DESCRIPTION OF THE DRAWINGS

The invention will now be described in greater detail in connection with the drawings, in which.

5. DETAILED DESCRIPTION OF PREFERRED EMBODIMENTS

According to one embodiment of the invention, certain toxic gases having relatively small molecular diameters are captured by forming type sI or type sII hydrates to decontaminate an area in which such toxic agent has been released. In order to form a type sI or type sII hydrate, the molecules of the toxic agent must be less than about 7 Å in diameter in order to fit within the voids of the hydrate cage. Bromine ($Br_2$, 5.9 Å), chlorine ($Cl_2$, 5.2 Å), hydrogen cyanide (HCN, 4.8 Å), and possibly phosgene ($CCl_2O$, 6.1 Å) are examples of such hydrate-forming toxic agents which are amenable to decontamination via hydrate formation. For example, chlorine hydrate can form at temperatures up to slightly over 25° C. and at pressures as low as only slightly higher than normal atmospheric pressure. Bromine is also known to form hydrate, although the full temperature/pressure hydrate formation/stability region of bromine is not completely known.

Figure 1:
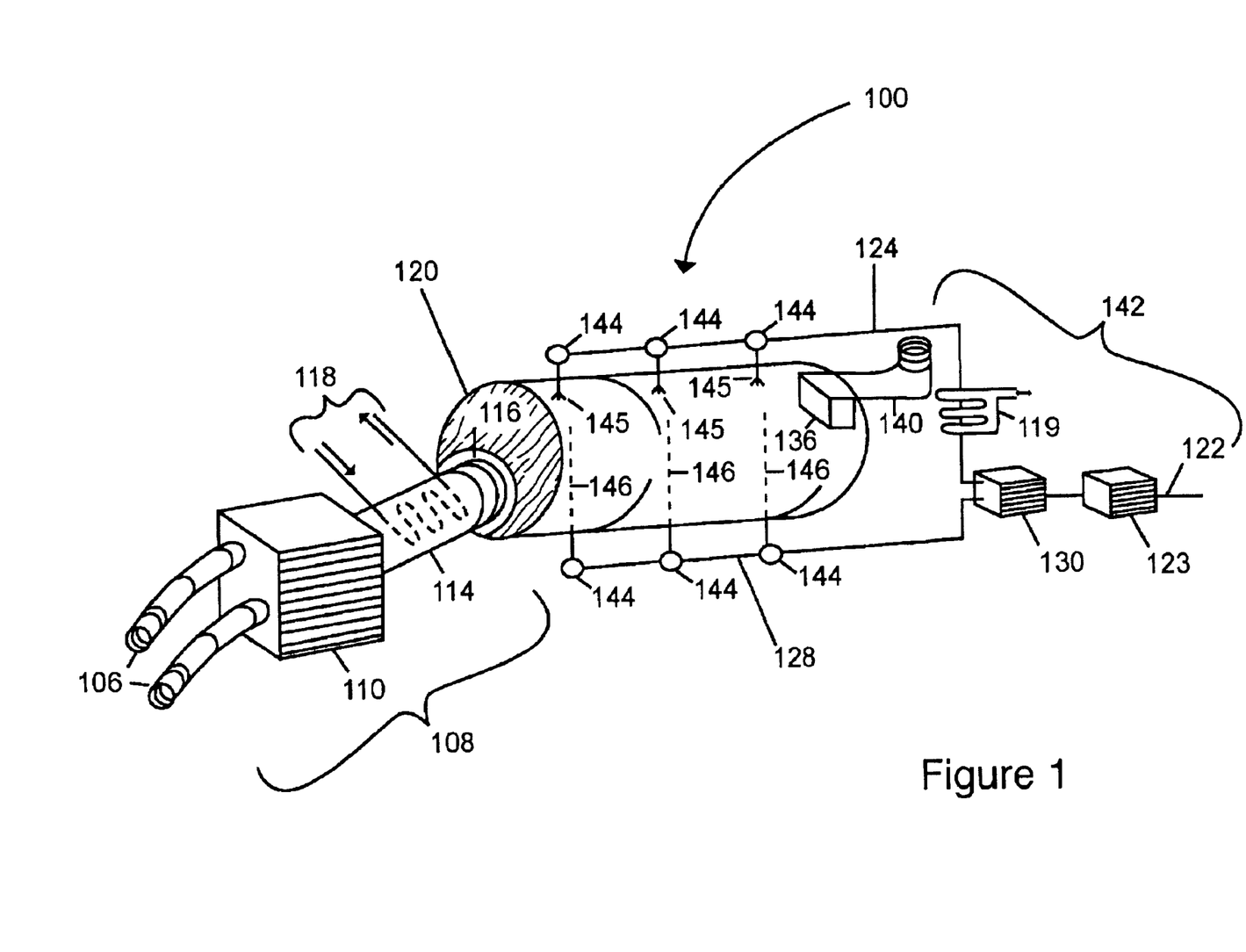
FIG. 1 is a diagrammatic perspective view of a first portable embodiment of hydrate-based decontamination apparatus according to the invention that is configured for use in forming hydrate of smaller-molecule toxic agents.

A toxic gas hydrate decontamination unit 100 by means of which relatively small-diameter toxic gas molecules can be converted to hydrate is illustrated in FIG. 1. The gas hydrate decontamination unit 100 is relatively modular in design. The hydrate formation vessel 120 is a central component of the apparatus for capture and concentration of the toxic gas. Although the vessel 120 is illustrated as a continuous, open cylinder, this is for simplicity only. Actual hydrate formation vessels 120 may be formed from joined, linearly arranged sections; may be concentrically arranged; or may have complex internal geometries to satisfy particular area or volume requirements within the vessel.

In the illustrated embodiment, the vessel is also the location for processing the toxic gas hydrate so that the toxic gas can be safely recovered. In addition to rendering the toxic gas non-reactive and therefore relatively safe, forming hydrate of the toxic gas also compresses it. Typically, in a type sI structure gas hydrate, there is a compression factor of about 160. In other words, for every volume of gas at standard pressure and temperature, about 160 volumes of gas can be held within each volume of hydrate. (For larger molecule toxic gases, which form type sH hydrates as addressed below, the compression factor is calculated to be on the order of about 30.) This allows for relatively low-pressure hydrate-formation vessels to contain volumes of gas that would otherwise require much higher pressures to be contained, i.e., if the gas were simply to be compressed to a comparable volume.

Certain toxic gas hydrates such as (but not limited to) chlorine and bromine hydrate have been determined to be stable at pressures as low as only two atmospheres above normal atmospheric pressure. The low-pressure nature of the hydrate formation vessel required to contain such toxic gas hydrate allows it to be fabricated of relatively light-weight material such as thin stainless steel, aluminum, or composite material, depending on the desired strength and chemical reaction anticipated with the various species of toxic hydrate-forming gas. As a result, hydrate formation vessels will be relatively inexpensive to fabricate and light enough to be highly portable by fixed-wing or rotary-wing (i.e., helicopter) aircraft to a contamination site.

An upstream component of the toxic gas hydrate decontamination unit 100 is the intake assembly 108. This assembly includes one or more flexible intake pipes 106 that can be connected so as to reach considerable distances into tunnels or buildings. These intake pipes 106 are water- and air-proof and, in a preferred embodiment, are fabricated from light-weight, strong synthetic fabric similar to modern parachute fabric. The shape of the pipe may be maintained by semi-rigid yet flexible helical plastic reinforcements. Such construction of the intake pipes 106 allows them to be very light-weight and to be folded into a small space for transport. Deployment at the decontamination site is rapid, with zipper of other waterproof fasteners being used to join multiple flexible intake pipe segments 106 together.

Following use, the intake pipes themselves will be contaminated and must be safely contained and disposed of. Because of their flexibility and ability to be folded into a small space, the used intake pipes are compressed into boxes or containers that provide for their chemical hazard isolation, and they are then taken to special decontamination facilities for disposal.

The light weight and ease of assembly of the intake pipes 106 enables them to be rapidly assembled and deployed from where the hydrate formation vessel 120 is located into the decontamination site, either remotely (by robot) or by suitably protected personnel. The intake pipes are connected to the housing of pump assembly 110 with quick-fit connections such as flanges, bayonet fittings, or other inexpensive and effective means for forming a joint. The intakes are extended into the immediate vicinity of the contamination, and the contaminated air is ingested by suction.

The toxic gas and atmospheric air are drawn into and slightly compressed by the pump assembly 110 into an intermediate stage pressure vessel 114, which may be made of flexible, semi-rigid, or rigid (and therefore much stronger) material, depending on the desired or required pressures for this region of the apparatus. The pumps in the assembly 110 can be directly electrically driven or driven hydraulically— whichever is safer and more expedient depending on factors such as the likelihood of igniting the toxic gas. The connection between the pump assembly 110 and the intermediate stage pressure vessel 114 is also a quick-change-type of fitting, which facilitates rapid initial set-up and provision of replacement modules as needed so that decontamination may proceed virtually uninterrupted even in the event of equipment failure. An intake air chiller 118 may also be provided so that the temperature inside the hydrate formation vessel is low enough for hydrate to form.

Exhaust system 140 ducts processed air away from the toxic gas hydrate decontamination unit. The exhaust system can be relatively short, or it can be long enough for the treated air to be carried some distance away. The fitting between the exhaust system 140 and the hydrate formation vessel 120 should also be of the quick-release type. If desired, a venturi assembly (not illustrated) can be provided in the exhaust system to mix exhaust gas with outside air to minimize moisture in the exhaust air stream. The exhaust gas will be at no greater pressure or temperature than that of the interior of the hydrate formation vessel 120. No compensation for raising or lowering temperature is necessary within the exhaust system, but provision for step-down of pressure (e.g., an energy-recovering, electricity-generating turbine (not shown) in the exhaust stream) may be provided.

Provision is also made to ensure that, taking into account compression from injecting the air-toxic gas stream, decompression of the gas as the hydrate forms, and the decompression as air from which toxic gas has been removed is released, formation of gas hydrate remains relatively continuous. To that end, gas flow through the system will not be perfectly continuous, but rather, may be pulsed so that internal pressure will be cycled from lower to higher by opening and closing one-way valves (not shown) at the junctions 116 and 136 of the air intake system and the air exhaust system, respectively, with the hydrate formation vessel 120.

The water injection system used to introduce into the system water from which the hydrate forms consists of a water injection line 124 and injectors 145, a recovery line 128, and collector pipes 146. The positioning of the injectors and collectors in FIG. 1 are not to scale or in precise positions, but rather reflects the general elements of the system. Water is injected as a spray or fine vapor that allows for optimum formation of gas hydrate from the air stream. The spray geometry and injection rate of the water can be varied by means of a variable spray valve inside the hydrate formation vessel or by inserting different nozzles prior to start-up.

Water collection drain pipes 146 each have a series of drainage slots or holes in their sides and are surfaced with hydrophobic coatings to retard the hydrate from adhering to them and clogging the water drain slots. The pipes protrude into the hydrate formation vessel 120 because it is expected that the hydrate formation vessel will become filled with gas hydrate and the permeability and porosity of hydrate in the lower part of the vessel may be such as not to permit surplus water to flow through the hydrate to exit through the water collection pipes.

Figure 2:
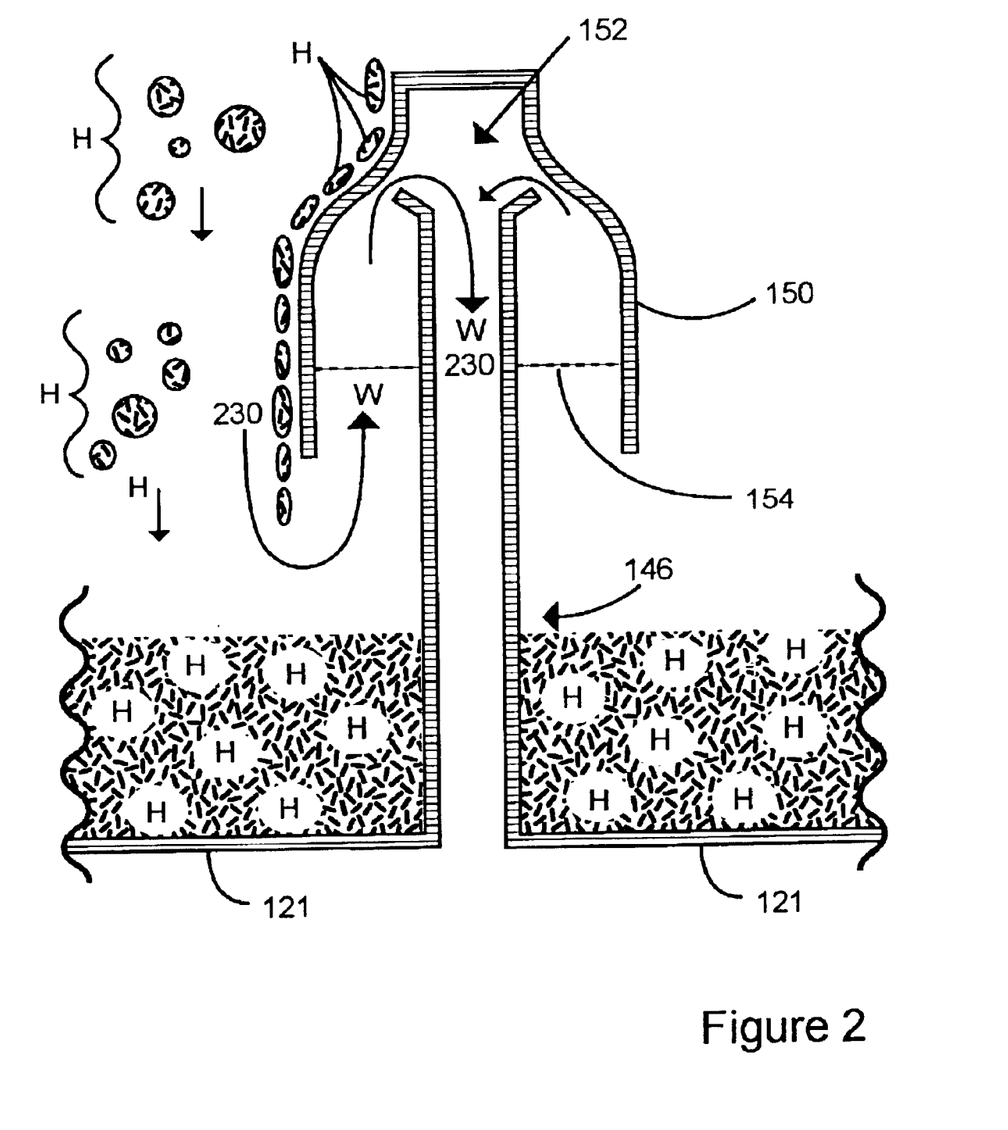
FIG. 2 is a diagrammatic section view of a water drainage pipe for use in the apparatus of FIG. 1 or FIG. 3.

A number of industrial gases form hydrate that is more dense than either fresh or saline water Excess water can be separated from hydrate, which will collect in the bottom 121 of the pressure vessel, by, for instance, use of a water trap. In order to ensure that the water collection drains in the sides of the water drain pipes 146 are blocked by hydrate formation as little as possible, they are preferably shrouded from above as illustrated in FIG. 2. Shrouded or hooded drain pipes 146 each have an overlapping, upper shroud or hood 150 that extends below the actual slot or hole 152 in the drain pipe mouth, which allows water (W) to enter the drain pipe 146 and flow down the pipe after it has separated from the higher density gas hydrate (H). The hood is held in place by internal braces 154. Hydrate (H) falls to the bottom 121 of the pressure vessel 120, where it accumulates and stratifies. Water exits from the pressure vessel 120 through a non-return valve (not shown) located either in the drain pipe or outside of it. When the hydrate rises to a level where no more water may be removed, the remaining water is drained and the hydrate-filled vessel is removed from the contaminated air-capture system and warmed so that the hydrate dissociates into gas and water. The drain pipes may be telescoping (not illustrated) to allow water to drain while hydrate settles so that a minimal amount of water above the settled hydrate is removed, recycled, and reused for forming hydrate.

Where positively buoyant hydrates form from toxic gases, the hydrate naturally rises within the water and the water drains in the lower part of the pressure vessel 120 can be relatively simple, screened drains with little or no drain pipe extending above the bottom 121 of the vessel 120.

It is known that chlorine, which is the most widely available of the industrial toxic gases that presumably may be used by terrorists, forms negatively buoyant gas hydrate. In those cases, hydrate that forms will settle to the bottom 121 of the hydrate formation vessel 120. In the case of positively buoyant toxic gas hydrates, on the other hand, the relative position of the hydrate and the water within the vessel 120 will be more complex, especially as water may not be drawn out of the hydrate formation vessel 120 continuously. As a result, water pockets may build up in the hydrate, and where hydrate amalgamates sufficiently, water will not drain through it because it will not be permeable enough. Therefore, draining as much free water from the system as possible via the collector pipes 146 ensures the greatest efficiency with respect to the overall amount of water used and the amount of hydrate formed. (It will also ensure that the smallest amount of water remains after decontamination activities stop, which water adds dead weight to the hydrate formation vessel and may impede handling.)

Once water spray is established and the injection-recovery system is charged, water that does not form hydrate and that drains from the vessel 120 is collected and recycled. Recycling system control 130 first recharges the water injection system 124 with water that has been collected at the bottom of the hydrate formation vessel 120; therefore, water is not dumped or disposed of on site, which would be undesirable since that water may contain dissolved fractions of the toxic gases. As gas hydrate continues to form, water is consumed at a rate on the order of not less than about 0.8 cubic meter of water for each cubic meter of hydrate (varying depending upon the particular hydrate). Therefore, water is drawn from a local source of water 122 by input pump 123 and fed into the injection system 124. (Because gas hydrates can form from different types of water including polluted, brackish, or saline water, the nature of the input water is essentially unimportant so long as it is cool enough or can be chilled enough for the gas hydrate to form.) Chiller 119 chills the input water to temperatures required for hydrate to form spontaneously. Where gas hydrate forms rapidly, the heat of exothermic formation of the hydrate will also need to be removed (e.g., by chilling) so that the pressure/temperature field within the hydrate formation vessel does not vary to the point that hydrate formation is retarded.

When a hydrate formation and storage vessel is filled with as much hydrate as can be contained, it is detached from the intermediate stage pressure vessel 114 and the air exhaust assembly 140. Pressure is maintained on the upstream supply of air containing the toxic gas to the hydrate formation vessel 120 by one-way valves on the intake housing, which allows the intake assembly 108 to be rapidly attached to and detached from a succession of hydrate formation and storage vessels while maintaining pressure conditions of hydrate stability within the vessel 114. Pressure is maintained on the downstream, exhaust assembly 140 by closing an air release valve assembly, which meters the exhaust air during the hydrate formation process to keep pressure within the hydrate formation vessel within the range required for hydrate stability. The hydrate formation vessel 120 is detached from the air intake 108 at its quick release junction 116, from the exhaust assembly 140, and from the water injection and recycling system 142, and another hydrate formation vessel 120 is fitted in its place. One-way valves 144 that are self-sealing upon removal of the water injection system 124 and water collection and drain system 128 allow the flexible water piping to be quickly detached from and fixed to successive tanks without allowing pressure within the hydrate formation vessel 120 to drop to a level where the toxic gas hydrate would become unstable in a very short period of time.

As shown in FIG. 1, the detachable valve system 144 is external to the pressure vessel 120. In another mode, the one-way detachable valves can be contained within the vessel, and connection may be by quick-fit insertion of a male plug for water injection 124 and drain 128 systems into a female socket in the pressure vessel at the base of the drain pipe 146.

Water remaining after the vessel is filled with as much hydrate as possible is left in the pressure vessel. When the hydrate is caused to dissociate by heating and/or lowering the pressure in the vessel after it has been removed from the toxic air collection system, the water released by the hydrate mixes with the excess water. The water and the hydrate-forming gas released upon dissociation of the hydrate separate naturally, whether the gas is in gaseous or liquid form (as determined by contolling the pressure and temperature in the vessel), and stratify by density. For example, if chlorine is the toxic gas being decontaminated and pressure (less than ten atmospheres) and temperature in the vessel are controlled to maintain the chlorine in liquid form after the hydrate dissociates, the liquid chlorine will be less dense than water and will float on the water. Although some mixing will occur when the fluid is being drawn from near the boundary between the two liquids, the two substances can be removed separately by draining into industry standard tanks for safe removal. If it is not used to form more hydrate during seququent decontamination, the remaining chlorine-saturated water can be nutralized by a number of simple means, e.g., by mixing it with sodium hydroxide, which causes the chlorine to form common table salt, NaCl. The concentrated toxic gas/liquid can then be removed from the pressurized vessel in which the hydrate has been from from the contaminated air. When the toxic gas and water have been removed, the hydrate formation vessel can be reused.

According to another embodiment of apparatus for practicing hydrate-based decontamination, toxic gas hydrate decontamination units can be fixed in place and brought into operation in a decontamination emergency. Where it can be anticipated that toxic gas attack terrorism is either very likely or likely to cause a large number of deaths or disruption, locations such as major government buildings, subway systems, and closed sports arenas can have permanently installed toxic gas hydrate decontamination units installed therein. Such fixed units are similar in construction to the previously described embodiment, but are constructed in accordance with their fixed nature rather than a need for portability. For instance, intake pipes can be built into the building either in a fixed manner or put in place in such a way that they can be replaced following a decontamination incident with a minimum amount of effort, but without the extreme flexibility and ease of handling that are a part of the portable intake pipe assembly described above.

Because it is known or anticipated beforehand where the greatest number of people are likely to be (for instance, in the seats of a covered sports arena), the intakes can be located so as to ingest air that has been contaminated by toxic gas in such a way that it is ingested from the likely areas that toxic gas may be released so that the toxic gas/air mix is drawn away from the people. Likewise, the exhaust assembly is built into the building to vent processed air to the outside of the building or insulation to be cleared.

A built-in apparatus for diverting toxic air from the location of the largest number of people in a building or other construction will also provide an element of protection even where the air contains gases that are not suitable for capture using hydrate formation. Many of the other toxic gases that are likely to be used by terrorists can be treated at least in part by being passed through a toxic gas hydrate formation unit since water—especially under mild pressure—can rapidly hydrolyze or hold in solution many of these other potentially hazardous and toxic gases.

Permanently installed gas hydrate decontamination units should have their air intake systems linked with building or installation ventilation systems. These can be designed to draw contaminated air away from personnel and into the decontamination units. Because the hydrate-forming gas is the airborne toxic gas itself, only water needs to be supplied to the apparatus.

Where permanent installations are established, the maximum anticipated size of a toxic gas hazard must be estimated and the decontamination units engineered accordingly so that a spill can be processed entirely with the installed equipment, unless provision is made for the easy exchange of hydrate formation vessels as in the case of portable apparatus as described above. In a sealed building from which personnel have been evacuated, however, it is feasible to operate the decontamination units through more than one cycle. In other words, when the hydrate storage tanks become filled, they may be processed through dissociation to allow the gas and water to be recovered. The gas may be safely stored in as concentrated and as pure a form as possible to reduce the toxic volume, and the water can be reused in subsequent cycles of hydrate formation and dissociation until decontamination is complete. The contaminated water is then disposed of in a manner similar to that with a portable apparatus.

Figure 3:
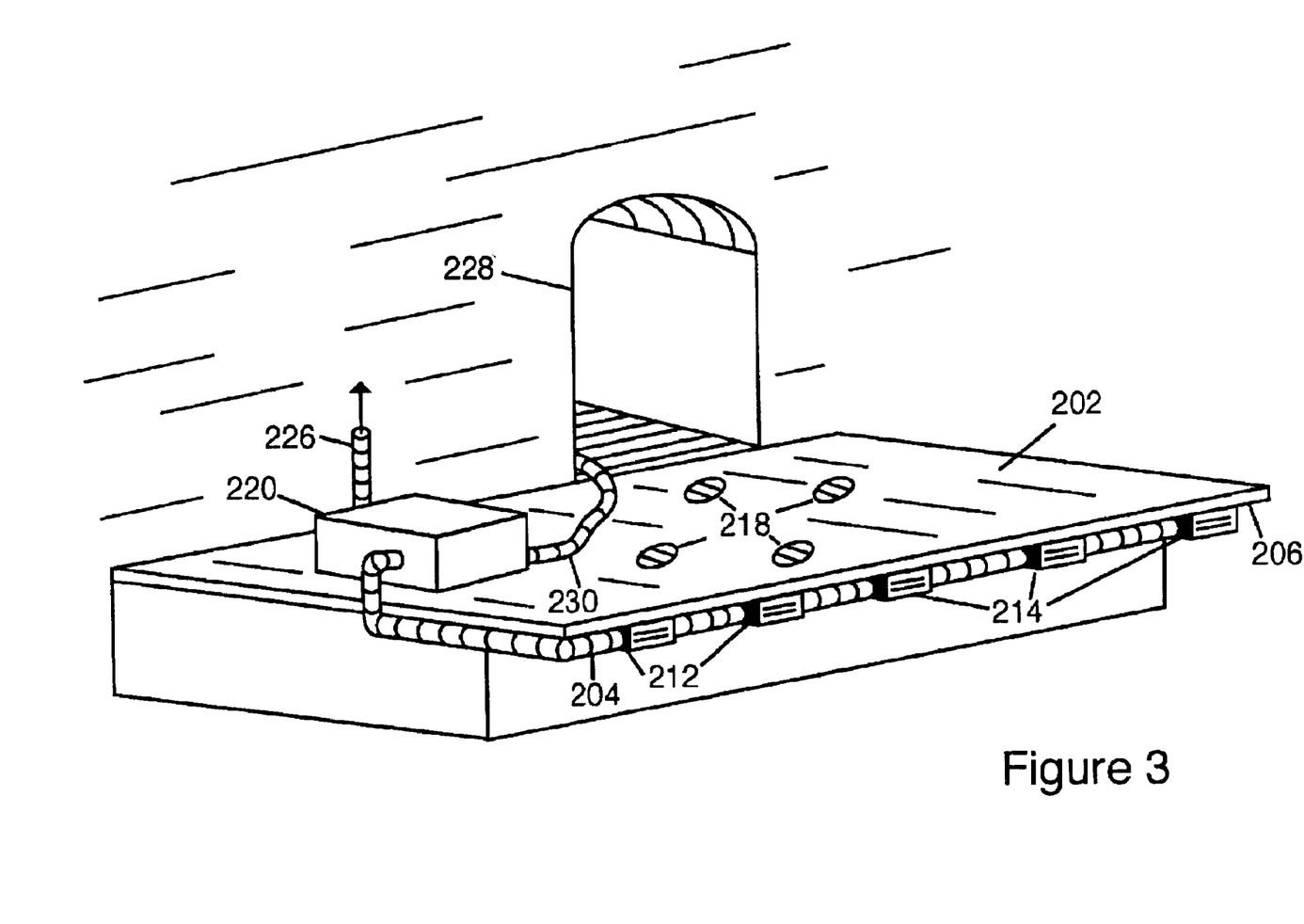
FIG. 3 is a diagrammatic perspective view illustrating a permanently installed embodiment of hydrate-based decontamination apparatus installed in a subway station according to the invention.

An example of such a permanently installed hydrate-based decontamination apparatus as installed, for instance, in a subway station is illustrated in FIG. 3. Because toxic gases that are likely to be used in a terrorist incident in such a confined space, e.g., chlorine, are heavier than air, air collection systems can be installed at a low level within the confined space. An air collection system using standard metal or plastic pipe 204 can, for instance, be placed beneath the lip 206 of the station platform 202 or in a flat pipe below the edge of the platform where there is insufficient "indentation" below the edge of the platform. The intakes can be spaced relatively close together, as illustrated by intakes 212, or relatively farther apart, as illustrated by intakes 214, depending on the likely density of people above or the local air volume to be processed. Internal constrictors (not shown) are provided, which are industry standard inserts into the airpipe or intake orifice that force the air to pass through an airspace in the constrictor that is smaller than the pipe in which it is inserted and thus reduce the air that can be inducted by particular intakes 212, 214. This allows for even or preferential intake of air regardless of the distance of a particular intake from the intake pump or fan. The collection system may also be placed at "ground" or track level, or a second, lower collection system may be placed below a "lip" installation to facilitate capture of all the gas and especially that which has descended to below the level of the platform where people will be located. Providing for a collection system nearly at, but just below, the platform level, however, will provide for best removal of any released gas from the immediate vicinity of the people. Embedded vents 218 may also be provided in the surface of the platform 202 to draw air and gas into the decontamination apparatus.

Contaminated air from the collection system 204 is drawn into a permanently installed hydrate fixation system 220, which can be activated automatically by means of sensors or manually either locally or from a remote location such as a disaster control room. The hydrate fixation system is shown as placed upon the platform 202 for simplicity of illustration, although actual installations may be built within an enclosure within the platform or into the walls of the enclosed space. A compact air pressurization and chilling system combined with a water spray injection system in a configuration similar to that in the apparatus illustrated in FIG. 1 and described above captures and compresses the toxic material in the form of gas hydrate. Purified air from which the toxic agent has been removed is exhausted to the surface via conduit 226 in a permanent ventilation system. The air collection system generates slightly negative pressure within the confined space so that fresh air enters the confined space, e.g., through passenger or other access passages 228. Thus, people exiting the confined space will be moving toward a fresh air influx, which is beneficial to their escape from the contaminated air and to their survival.

According to a further embodiment of apparatus according to the invention, certain locations or environments can themselves be pressurized and chilled, if necessary, in their entirety so that toxic gas and liquid suitable for forming gas hydrates can be converted to gas hydrate upon the introduction of water in situ, i.e., without the hydrate-forming gas or liquid having to be drawn into any of the apparatus described above. For example, a tunnel in which a toxic hydrate-forming substance has been released (e.g., by a leaking or crashed truck carrying a large load of liquid chlorine that is evaporating as the liquid chlorine leaks from the truck) can be sealed at both ends along with all airshafts and ventilation apparatus so that moderately elevated pressures can be generated and maintained within the tunnel. Thus, the tunnel can be isolated.

Once isolated, the tunnel is pressurized and chilled as necessary so that the toxic gas or liquid will spontaneously form gas hydrate upon the introduction of water into the tunnel. This can be done, for instance, by robotic equipment or by personnel suitably protected to enter the toxic gas hazard area. Once the toxic gas and/or liquid has been converted to hydrate, it is chemically inert and can be collected as a solid material in a number of fashions. Ideally, it is placed in hydrate dissociation tanks (that can be similar to the above-described hydrate formation/dissociation vessels) and allowed to dissociate in controlled fashion to release the constituent water and gas of the hydrate. The gas and water then naturally separate, and the toxic gas and water can be concentrated under safe conditions as previously described.

Another embodiment of apparatus according to the invention is a portable, in-situ containment structure (chemical hazard containment structure) that is similar to an inflatable dome fabricated from airtight, artificial fabric. The dome is large enough to contain an entire vehicle such as a bus or rail car from which toxic gas/liquid has been spilled or is leaking. The structure must be strong enough to maintain the slightly elevated pressures required to allow gas hydrate to form. Ideally, it would be rapidly deployed around the situs of the restricted chemical hazard incident; water spray would be injected; and the toxic gas rendered harmless in the form of gas hydrate so that it could be removed to dissociation apparatus and the gas and water recovered as previously described.

Thus, as described above according to the invention, toxic gases having relatively small molecules (e.g., less than about 7 Å diameter) that form sI and sII hydrates are captured and removed from contaminated air by directly compressing the gases and the atmospheric air in which they are borne in the presence of water. Additionally, hydrates of toxic hydrate-forming materials are formed directly from liquids of toxic gases (e.g., liquid chlorine) because the toxic gases will spontaneously form hydrates in the presence of water under appropriate temperature and pressure conditions.

Where toxic gases having molecules that are too large to permit formation of sI or sII hydrates are dispersed in air, simply bringing the toxic gas and the atmospheric air to pressure and temperature conditions suitable for forming gas hydrate of the particular toxic gas will not cause hydrate of the toxic gas to form. That is because a substantial percentage of both the smaller and larger voids in the gas hydrate must be filled by gas molecules of appropriate size in order to stabilize the gas hydrate crystalline lattice, but the large toxic gas molecules are too large to fill the voids in sI or sII hydrates or to fill the small voids in sH hydrates and other large hydrates with very asymmetrical (i.e., different diameter) voids. Thus, the water molecule lattice will not form gas hydrate in that situation.

Such larger-molecule toxic agents may, however, be captured and bound up in type sH hydrate by using a "companion agent" or "companion gas" to stabilize the hydrate lattice. The companion agent is a gas other than the larger-molecule toxic agent, the molecules of which are small enough (less than about 7 Å) to fill the smaller voids in sH hydrate. The larger molecules of the toxic agent (greater than about 7 Å) occupy the larger voids in the hydrate crystal, and the lattice thereby remains stable. Thus, toxic agents having relatively large molecules can also be captured using hydrate to decontaminate an area in which such larger-molecule toxic agents have been released.

The companion gas may be a single species of gas such as essentially pure carbon dioxide, chlorine, hydrogen sulfide or methane (which are known to participate in forming sH type hydrate), or a mixture of gases. Ideally, the companion gas is non-toxic and chemically inert, such as some of the hydrocarbon gases and/or carbon dioxide, but it may itself be a toxic gas such as chlorine. The presence of chlorine, in particular, allows the larger-molecule toxic gas to be incorporated into sH gas hydrate at relatively low pressures (on the order of three atmospheres) and high temperatures (on the order of twenty five degrees Celsius), and chlorine is available at relatively low cost. This has the benefit of allowing much more rapid and less costly sequestration of the large molecule toxic gases.

In addition to using this method to separate and sequester larger-molecule toxic gas from air, the method may also be applied to liquids in which such toxic gases are dissolved. When a suitable companion gas and either water or water vapor is passed through a fluid containing the dissolved, large-molecule toxic materials under appropriate conditions of temperature and pressure, gas hydrate will form.

When the gas hydrate forms, it extracts the toxic agent from the fluid in which it is dissolved and incorporates it into the large voids of the solid hydrate. The hydrate is then separated from the fluid by buoyancy or other separation processes and is brought to a hydrate concentration vessel, as described above in the context of smaller-molecule toxic gases, where it is washed or otherwise purified of residual fluid while it is a stable solid hydrate. The fluid may be either toxic or non-toxic and is handled and disposed of appropriately, separate from the toxic hydrate. The toxic hydrate may be safely stored in the hydrate form, where it is chemically inert. Because the toxic gas is compressed when incorporated in gas hydrates (by a factor estimated to be on the order of about 30 as compared to the volume the gas would occupy at ambient atmospheric temperature and pressure for some sH hydrates), the toxic gas will occupy a relatively small volume. Such safely "stored" toxic gas may not be as compressed as would be the case if the toxic gas were stored in liquid form; however, storage of these toxic gases in the form of gas hydrates may be safer than storage solely in pressurized containers containing gas, liquid, or a mixture thereof.

Once the larger-molecule toxic gas hydrate has been formed and collected using methodology as described above in connection with smaller-molecule toxic gas hydrate, it may be allowed to dissociate in a controlled fashion by means of which the toxic gas can be gathered and condensed. Dissociation of the toxic gas hydrate may, in fact, provide a controllable method not only for gathering toxic agents, but also for detoxifying these materials (both larger-molecule and smaller-molecule)—particularly nerve agents.

Nerve agents are lethal organo-phosphorous compounds. Over two thousand different related species have been identified, and these include many insecticides. The two major types of nerve agents are non-persistent (G-agents) and persistent (V-agents). The non-persistent group of nerve agents is volatile and mainly a vapor hazard when inhaled. The persistent group of nerve agents is generally nonvolatile and mainly a liquid exposure hazard to the skin or eyes. V-agents (VX, etc.) are known to be up to ten times more poisonous than the G-agents.

TABLE 3

Examples of types of nerve agent groups

| Name | Code Name | Chemical Structure |
| --- | --- | --- |
| Non-persistent | | |
| Tabun | GA | $(CH_3)_2N-P(=O)(-CN)(-OC_2H_5)$ |
| Sarin | GB | $(CH_3)-P(=O)(-F)(-OCH(CH_3)_2)$ |
| Soman | GD | $(CH_3)-P(=O)(-F)(-OCH(CH_3)C(CH_3)_3)$ |
| Cyclohexyl methylphosphonoflouridate | GF | $(CH_3)-P(=O)(-F)(cyclo-C_6H_{11})$ |

TABLE 3-continued

Examples of types of nerve agent groups

| Name | Code Name | Chemical Structure |
|---|---|---|
| Persistent | | |
| O-ethyl S-diisopropylaminomethyl methylphosphonothiolate | VX | $(CH_3)-P(=O)(-SCH_2CH_2N[CH(CH_3)_2]_2)$ $(OC_2H_5)$ |

Many of these agents are soluble in water. For instance, the nerve agents Sarin and Soman both hydrolyze, thereby changing chemical structure and becoming non-toxic except for some reaction products. For instance, hydrogen fluoride (HF), which is itself toxic but can be handled safely and disposed of, and phosphoric acid, which is essentially non-toxic in dilute mixtures, are produced as a result of the hydrolization. In addition, mustard agent is also slightly soluble in water and hydrolyzes slowly, thereby producing the acid hydrogen chloride (HCl), which is not unduly toxic in weak to moderate concentrations. A prime reactant to detoxify these materials through simple chemical reactions is water, through a process of hydrolysis, and the water and gas mixture produced when hydrate is dissociated may be optimal to promote these chemical reactions that break down the nerve agents. Thus, it will be appreciate that first forming hydrate facilitates hydrolysis by efficiently "gathering" the toxic agent in the hydrate.

Upon formation of the toxic gas hydrate, the toxic molecules are dispersed in a framework of water molecules, with each individual toxic molecule surrounded by numerous water molecules. When the hydrate dissociates, each molecule of toxic gas is surrounded by water molecules. This natural mixing of toxic gas molecules and liquid water in the dissociation product is highly effective to increase the rate of hydrolysis of the toxic molecules during and immediately following dissociation. Reaction of water with the toxic gas causes a chemical reaction that changes the original toxic gas molecule and renders it essentially harmless and is presently one of the main means of decontaminating these agents. Thus, not only may toxic material be captured and rendered harmless once incorporated within hydrates, but dissociation of those same toxic material-containing hydrates may introduce an efficient process of hydrolysis that chemically detoxifies the toxic material.

Figure 4:
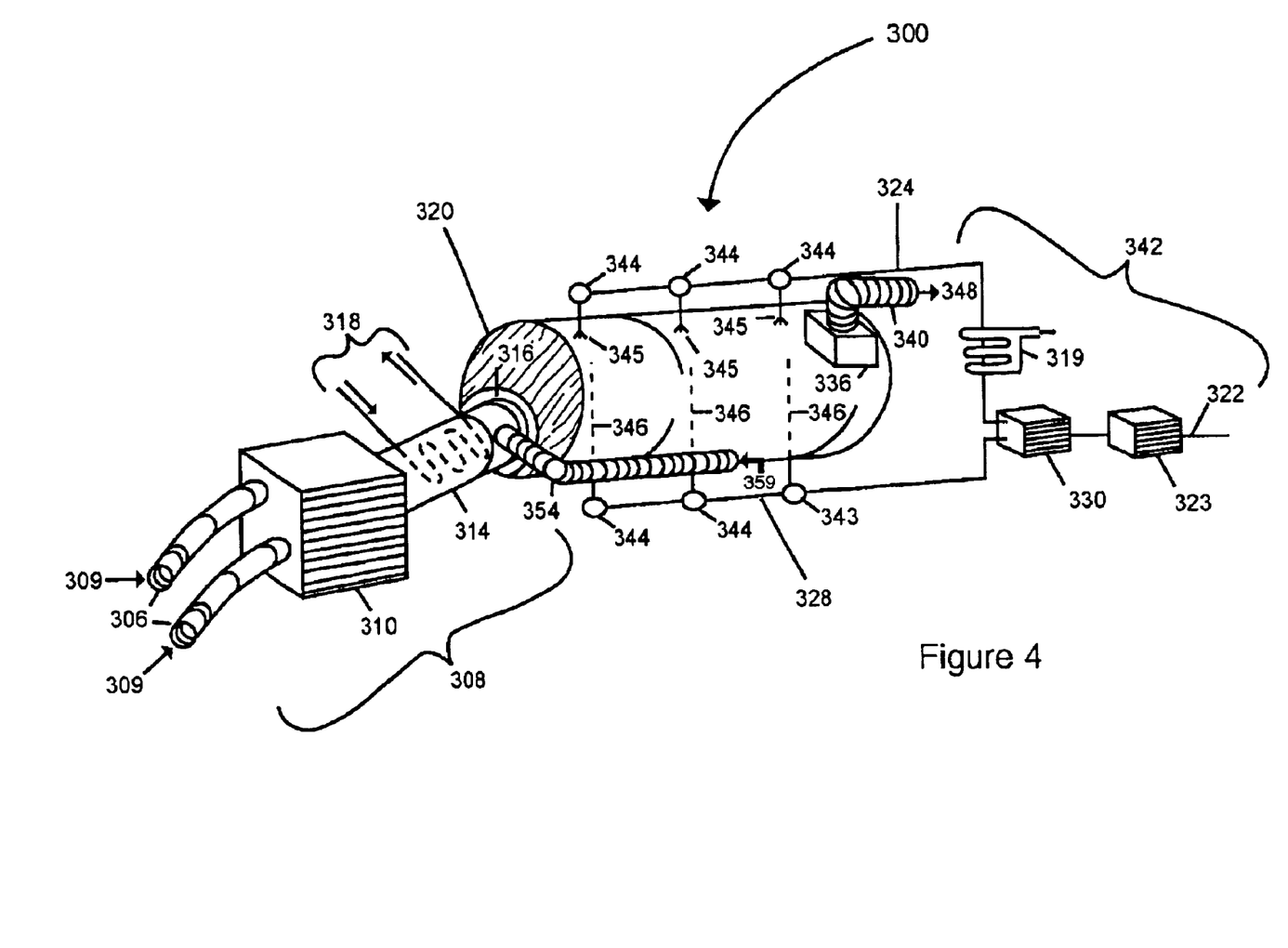
FIG. 4 is a diagrammatic perspective view of a second portable embodiment of hydrate-based decontamination apparatus according to the invention that is configured for use in forming hydrate of larger-molecule toxic agents.

Portable apparatus 300 for decontaminating an area in which a larger-molecule toxic agent has been released is illustrated in FIG. 4. The apparatus may be generally identical to that illustrated in FIGS. 1 and 2, and components of the apparatus illustrated in FIG. 4 that are identical or generally similar to components illustrated in FIG. 1 are labeled similarly but in the 300's instead of the 100's. The portable apparatus for decontaminating larger-molecule toxic agents by means of gas hydrate illustrated in FIG. 4 differs from the apparatus illustrated in FIG. 1 primarily to the extent that a companion gas or companion agent conduit 356 is provided. Preferably, the companion gas conduit 354 provides companion or helper gas 359 to the intermediate pressure vessel 314, i.e., upstream of the main, hydrate formation pressure vessel 320, so that the companion gas is pressurized and can participate in hydrate formation as quickly and efficiently as possible. The apparatus 300 shown in FIG. 4 operates and is used in generally the same manner as described above in connection with the portable apparatus illustrated in FIG. 1, with the additional provision of providing a helper or companion gas or agent.

Furthermore, apparatus for decontaminating larger-molecule toxic agents via hydrate formation can be installed on a permanent basis, e.g., as part of the ventilation system of a building as illustrated in FIG. 3 for smaller-molecule toxic agent decontamination apparatus.

The apparatus 300, it will be appreciated, is also suitable for forming smaller-molecule gas hydrate, as described above. In the case of smaller-molecule toxic gases that spontaneously form sI or sII gas hydrate, injecting a non-toxic companion gas into the inflowing contaminated air 309 will not affect the formation of the toxic gas hydrate, and it (the companion gas) will be expelled from the apparatus along with the decontaminated air 348.

The foregoing detailed description has been provided merely to illustrate the principles of the present invention and is not intended to be limiting. To the contrary, the present invention is intended to encompass all substitutions, modifications, and equivalents within the spirit and scope of the appended claims.

We claim:

1. A method for decontaminating an area in which a hydrate-forming toxic agent has been released, said method comprising:
   gathering said toxic agent into a containment vessel; and
   admixing said toxic agent in said containment vessel with water under temperature and pressure conditions conducive to the formation of gas hydrate of said toxic agent so as to form toxic agent hydrate.

2. The method of claim 1, wherein said toxic agent has a molecular size that is less than or equal to about 7 Å.

3. The method of claim 2, wherein said toxic agent is selected from the group consisting of chlorine, bromine, and hydrogen cyanide.

4. The method of claim 2, wherein said toxic agent forms type sI or type sII hydrate.

5. The method of claim 1, wherein said toxic agent has a molecular size that is greater than about 7 Å.

6. The method of claim 5, wherein said toxic agent is a nerve agent.

7. The method of claim 6, wherein said nerve agent is a non-persistent nerve agent.

8. The method of claim 7, wherein said non-persistent nerve agent is selected from the group consisting of Sarin, Soman, Tabun, and Cyclohexyl methylphosonoflouridate.

9. The method of claim 6, wherein said nerve agent is a persistent nerve agent.

10. The method of claim 9, wherein said nerve agent is VX.

11. The method of claim 5, wherein said toxic agent is mustard gas.

12. The method of claim 5, wherein said toxic agent forms type sH hydrate.

13. The method of claim 12, further comprising admixing a helper or companion agent with said toxic agent and said water in said containment vessel, said helper agent and said toxic agent filling smaller voids and larger voids in said type sH hydrate, respectively.

14. The method of claim 13, wherein said helper or companion agent is also a toxic agent.

15. The method of claim 13, wherein said helper or companion agent is non-toxic.

16. The method of claim 13, wherein said helper or companion agent is selected from the group consisting of carbon dioxide, chlorine, hydrogen sulfide, and methane.

17. The method of claim 1, wherein said toxic agent is gaseous or forms a gas under ambient temperature and pressure conditions and wherein gathering said toxic agent into said containment vessel comprises drawing or pumping said toxic agent in its gaseous or liquid form into said containment vessel along with atmospheric air in which said toxic agent has been dispersed.

18. The method of claim 1, wherein said admixing comprises spraying water into said containment vessel.

19. The method of claim 1, wherein said containment vessel is filled with said water and said admixing comprises bubbling said toxic agent through said water.

20. The method of claim 1, further comprising pressurizing said containment vessel.

21. The method of claim 1, further comprising cooling said containment vessel.

22. The method of claim 1, wherein said containment vessel is modular or detachable, said method further comprising replacing said containment vessel with an empty, replacement containment vessel when said containment vessel has become filled with toxic agent hydrate.

23. The method of claim 1, further comprising recycling water that has been introduced into said containment vessel but has not participated in hydrate formation.

24. The method of claim 1, further comprising venting cleaned air from said containment vessel.

25. A method for decontaminating an area in which a hydrate-forming toxic agent has been released, the molecular size of said agent being of a large size incapable of forming a stable hydrate of sI or sII type, said method comprising:
gathering said toxic agent in a containment vessel;
admixing said toxic agent in a containment vessel with water and a hydrate-forming companion agent, the companion agent being of a molecular size capable of forming a stable hydrate of sI or sII type; and
controlling temperature and pressure conditions in said vessel so as to cause the water, the toxic agent, and the companion agent to form a stable hydrate containing both the toxic agent and the companion agent.

26. The method of claim 25, wherein said toxic agent is a nerve agent.

27. The method of claim 26, wherein said nerve agent is a non-persistent nerve agent.

28. The method of claim 27, wherein said non-persistent nerve agent is selected from the group consisting of Sarin, Soman, Tabun, and Cyclohexyl methylphosonoflouridate.

29. The method of claim 26, wherein said nerve agent is a persistent nerve agent.

30. The method of claim 29, wherein said nerve agent is VX.

31. The method of claim 25, wherein said toxic agent is gaseous or forms a gas under ambient temperature and pressure conditions and wherein gathering said toxic agent into said containment vessel comprises drawing said toxic agent into said containment vessel along with atmospheric air in which said toxic agent has been dispersed.

32. The method of claim 31, wherein said admixing comprises spraying water into said containment vessel.

33. The method of claim 31, wherein said admixing comprising bubbling the atmosphere air in which said toxic agent has been dispersed through a water bath.

34. The method of claim 25, further comprising recycling water that has been introduced into said containment vessel but has not participated in hydrate formation.

35. The method of claim 25, further comprising venting decontaminated air from said containment vessel.

36. The method of claim 25, further comprising deploying portable hydrate-formation decontamination apparatus in the vicinity of said decontamination site, said portable hydrate-formation decontamination apparatus including said containment vessel.

37. The method of claim 25, wherein said toxic agent is liquid under ambient temperature and pressure conditions and wherein said gathering comprises by pumping said toxic agent and into said containment vessel.

38. The method of claim 25, further comprising constructing said containment vessel on sites in the area in which said toxic agent has been released, said containment vessel being constructed as an enclosure which surrounds and isolates the sites of said toxic agent release.

39. The method of claim 38, further comprising pressurizing said enclosure.

40. A method for neutralizing a nerve agent, the molecular size of said nerve agent being of a large size incapable of forming a stable hydrate of sI or sII type, said method comprising:
admixing said nerve agent in a containment vessel with water and a hydrate-forming companion agent, the companion agent being of a molecular size capable of forming a stable hydrate or sI or sII type;
controlling temperature and pressure conditions in said vessel so as to cause the water, the toxic agent, and the companion agent to form a stable hydrate containing both the toxic agent and the companion agent.

41. The method of claim 40, wherein said nerve agent is a non-persistent nerve agent.

42. The method of claim 41, wherein said non-persistent nerve agent is selected from the group consisting of Sarin, Soman, Tabun, and Cyclohexyl methylphosonoflouridate.

43. The method of claim 40, wherein said nerve agent is a persistent nerve agent.

44. The method of claim 43 wherein said nerve agent is VX.

45. The method claim 40, wherein said nerve agent has been released and said method further comprises gathering said nerve into said containment vessel.

46. The method of claim 45, wherein said toxic agent is gaseous or forms a gas under ambient temperature and pressure conditions and wherein said gathering said toxic agent into said containment vessel comprises drawing said toxic agent into said containment vessel along with atmospheric air in which said toxic agent has been dispersed.

47. The method of claim 46, wherein said admixing comprises spraying water into said containment vessel.

48. The method of claim 46, wherein said admixing comprising bubbling the atmosphere air in which said toxic agent has been dispersed through a water bath.

49. The method of claim 40, further comprising recycling water that has been introduced into said containment vessel but has not participated in hydrate formation.

50. The method of claim 40, further comprising venting decontaminated air from said containment vessel.

51. The method of claim 40, further comprising deploying portable hydrate-formation decontamination apparatus in the vicinity of said decontamination site, said portable hydrate-formation decontamination apparatus including said containment vessel.

52. The method of claim 51, further comprising constructing said containment vessel on sites in the area in which said toxic agent has been released, said containment vessel being constructed as an enclosure which surrounds and isolates the sites of said toxic agent release.

53. The method of claim 45, wherein said toxic agent is liquid under ambient temperature and pressure conditions and wherein said gathering comprises by pumping said toxic agent and into said containment vessel.

* * * * *